United States Patent [19]

Sado

[11] 3,855,460

[45] Dec. 17, 1974

[54] STATIC-DYNAMIC CONVERSION SYSTEM

[75] Inventor: Ichiro Sado, Tokyo, Japan

[73] Assignee: Canon Kabushiki Kaisha, Tokyo, Japan

[22] Filed: July 9, 1973

[21] Appl. No.: 377,255

[52] U.S. Cl. .............................. 235/156, 307/224 R

[51] Int. Cl. .............................................. G06f 1/04

[58] Field of Search ............ 235/156, 152; 307/208, 307/221 R, 224 R; 328/129

[56] References Cited

UNITED STATES PATENTS

| | | | |
|---|---|---|---|
| 2,769,592 | 11/1956 | Burkhart et al. | 235/152 X |
| 3,021,066 | 2/1962 | Martens | 235/160 |
| 3,268,819 | 8/1966 | Eachus | 307/224 X |
| 3,555,295 | 1/1971 | Toy | 307/224 |
| 3,657,529 | 4/1972 | Hamano | 235/156 X |

*Primary Examiner*—Malcolm A. Morrison
*Assistant Examiner*—James F. Gottman
*Attorney, Agent, or Firm*—Fitzpatrick, Cella, Harper & Scinto

[57] ABSTRACT

Static information stored in a storage device is converted into dynamic information by a conversion system which comprises a selecting device such as a diode matrix to which is applied the information read out from the storage device together with a reference signal for selecting the combinations of the information read out and delay devices for delaying output information from the selecting device.

4 Claims, 7 Drawing Figures

FIG. 6

| BR 84 I | DECIMAL | SEQUENCE OF OPERATION |
|---|---|---|
| 0000 | 0 | K→V |
| 0001 | 1 | H→Z→L→V |
| 0010 | 2 | D→Y→M→V |
| 0011 | 3 | D→Y→G→Z→L→V |
| 0100 | 4 | C→X→N→V |
| 0101 | 5 | C→X→J→L→V |
| 0110 | 6 | C→X→E→Y→M→V |
| 0111 | 7 | C→X→E→Y→G→Z→L→V |
| 1000 | 8 | A→W→O→V |
| 1001 | 9 | A→W→I→Z→L→V |
| 1010 | 10 | A→W→F→Y→M→V |
| 1011 | 11 | A→W→F→Y→G→Z→L→V |
| 1100 | 12 | A→W→B→X→N→V |
| 1101 | 13 | A→W→B→X→J→Z→L→V |
| 1110 | 14 | A→W→B→X→E→Y→M→V |
| 1111 | 15 | A→W→B→X→E→Y→G→Z→L→V |

STATIC-DYNAMIC CONVERSION SYSTEM

BACKGROUND OF THE INVENTION

The present invention relates to generally a system for converting static data or information in a computer into dynamic information or data and more particularly a system for converting static information at the digit positions of an output device such as a display device or printer into dynamic information.

Because of the demands for more compactness in size and economy, static output devices of the computers are superseded by dynamic output devices which have been recently devised and demonstrated successfully. There is no serious problem when the dynamic output devices are used only to output numerals, but when it is desired to output some symbols such as a decimal point, a comma for separating three digit groups from each other, a symbol for separating groups of data from each other, function symbols or the like, the dynamic output devices become extremely complex in construction, thus resulting in unreliable operation. For example when it is desired to output dynamic information about a decimal point, a dynamic shift register used exclusively for obtaining dynamic decimal point digit position information or a counter of modulo *n* is required so that the dynamic output devices become large in size.

SUMMARY OF THE INVENTION

The present invention contemplates to overcome the above and other problems encountered in the conventional dynamic output devices, and has for its object to provide a simple system for converting static data into dynamic data.

The system of the present invention may be used not only with output devices but also with any device or apparatus where the conversion of the static data into dynamic data is required. For instance, the system of the present invention serves for an interface or the like.

Since the system of the present invention comprises only registers and a matrix, it is adapted to be fabricated as an LSI circuit so that an output device may be made remarkably compact in size.

BRIEF DESCRIPTION OF THE DRAWINGS

The above and other objects, features and advantages of the present invention will become more apparent from the following description of preferred embodiments thereof, in which the present invention is applied to derive a dynamic output of a decimal point, in conjunction with the accompanying drawing in which;

FIG. 6 is a chart used for the explanation of the system shown in FIG. 1; and

DESCRIPTION OF THE PREFERRED EMBODIMENTS

Figure 1:
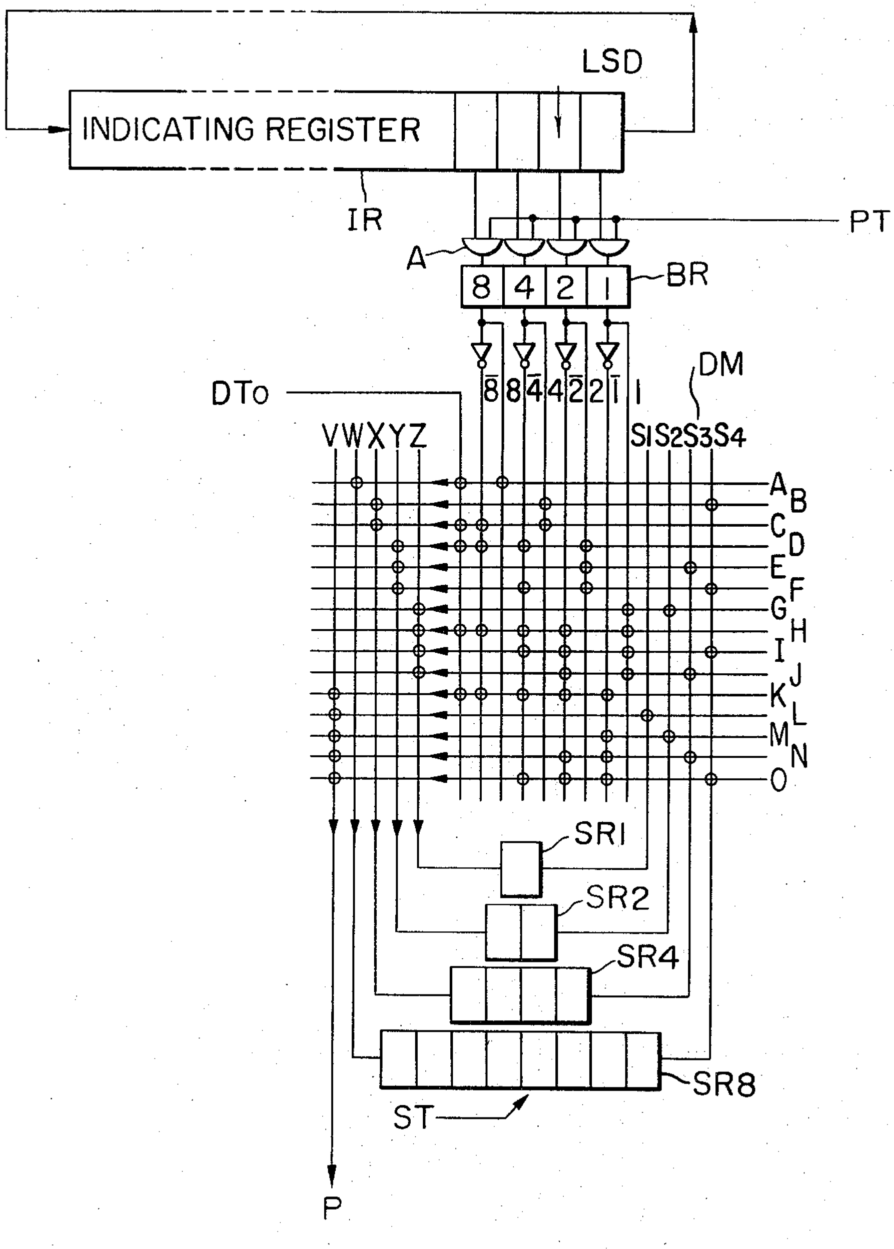
FIG. 1 is a block diagram of a first preferred embodiment of the present invention.
Figure 2:
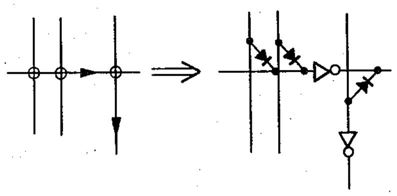
FIG. 2 is a view of an array of a part of the diode matrix used in the embodiment shown in FIG. 1.

Referring to FIG. 1, IR denotes an indicating register which stores and circulates numerical information to be displayed; BR is means such as a buffer register for storing therein the information of a specific digit place in a indicator; DM is selecting means such as a diode matrix to which is applied the content of the storage means BR; and $SR_1 - SR_8$ are, delay means such as shift registers adapted to delay and circulate the content of the selecting means DM. The indicating register stores and circulates the information about a decimal point in addition to the numeral information. When the decimal point information reaches the stage of the least significant digit LSD, the timing signal PT is applied to one of the input terminals of an AND gate A so that the content is transferred into the buffer register BR.

The buffer register BR is adapted to hold its memory for at least a time equal to one circulation time of the indicating register IR. That is, the specific digit place of the indicator where the decimal point is to be displayed is stored in the buffer register BR. The decimal point information is sometimes transferred into the buffer register BR from a decimal point circuit or a control circuit for controlling the position or place of the indicator for indicating or displaying a specific symbol. In any case it suffices to store, in the form of a binary coded information, the information to be displayed in the specific digit place of the indicator in the buffer register. The output of the buffer register BR is transferred into the selecting means or diode matrix DM together with the information DTo about a reference digit place such as the least significant digit of the indicator or indicating register. If the specific digit place where the decimal point is to displayed is the least significant digit, that is if a number to be displayed is an integer, the specific digit place is represented as 0 digit place and the binary coded information 0000 is stored in the buffer register. When the output of the buffer register BR is applied to the diode matrix DM, the logic outputs on the lines $\bar{1}$, $\bar{2}$, $\bar{4}$ and $\bar{8}$ become 1*s*, and the logic product of these logic outputs 1*s* and the least significant digit signal DTo is derived from the line K. The decimal point digit time information P is derived as the OR function on the line V, so that the decimal point is displayed at the least significant digit of the indicator DP shown in FIG. 3.

When the decimal point is to be displayed at the first digit place of the indicator, that is, when the number to be displayed is 34.5, the information 0001 is stored in the buffer register BR. Therefore the logic 1 outputs are derived from the lines 1, $\bar{2}$, $\bar{4}$ and $\bar{8}$, and the logic product of these outputs and the reference digit point timing signal DTo is derived from a logic product line H, and thus the output 1 is derived from a logic sum line Z, and is delayed through the shift register SR1 (a flip-flop adapted to delay the content a time equal to one digit time) a time equal to one digit time before it is fed back to a line S1 in a logic product stage. Therefore an output appears on a line L, and the decimal point digit time information P appears on the line V at a timing of the first digit so that the decimal point is displayed at the first digit point at a time DT.

When the decimal point is to be displayed at the seventh digit place of the indicator, 0111 is stored in the buffer register. The output signal appears on the line C and then on the line X and is transmitted to the delaying shift register SR4 where the output signal is delayed by a time equal to four digit time because the content in the shift register SR4 is shifted in response to the shift pulses ST associated with the reference digit place signal DTo. The output of the shift register SR4 appears on the line E and then on the line Y. The output derived from the line Y is further delayed by the shift register SR2 by two digit time before it is transmitted on the line G. In response to the output on the line G, the output is derived from the line Z and is delayed by the shift register SR1 by one digit time. As a result, the output is delayed by $4+2+1=7$ digit time so that the decimal point digit time signal P appears at DT7.

Figure 3:
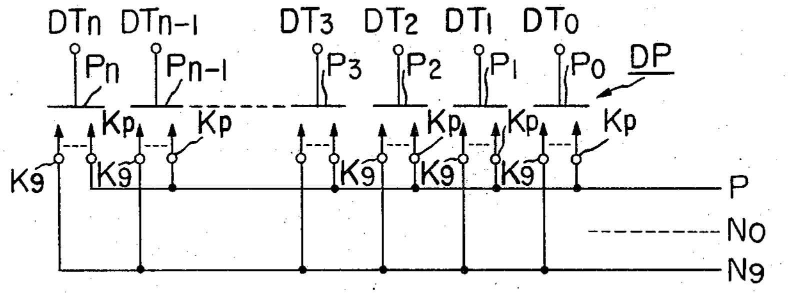
FIG. 3 is a view used for the explanation of the dynamic display of a decimal point.
Figure 4:
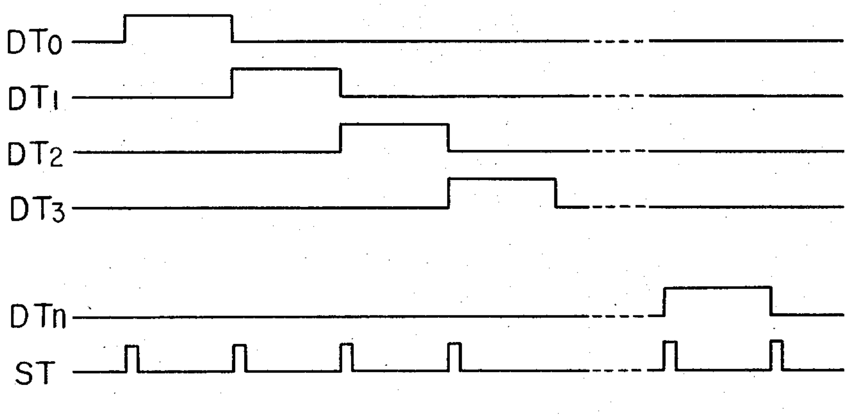
FIG. 4 shows waveforms used for the explanation thereof.

In case of the dynamic display as shown in FIG. 3, the digit signals DTo, DT1, DT2, . . . and DT*n* are applied to the anodes P*o* – P*n* in the order named from the least significant digit. The cathodes are connected to common lines, and when a certain digit place signal DT*i* is applied, a numeral signal, a decimal point signal and the like appear on the lines N*o* – N9 and P, whereby a numeral is displayed. Thus according to the present invention the decimal point may be displayed dynamically as in the case of the numerals.

Figure 5:
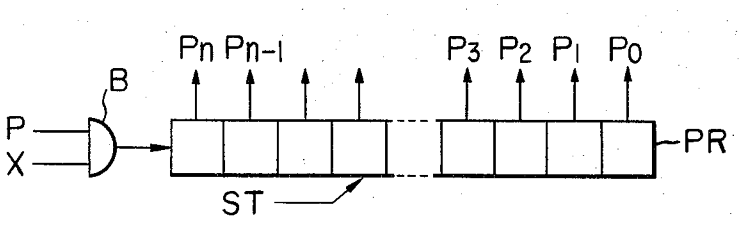
FIG. 5 illustrates a shift register for converting information, which has been converted into dynamic information according to the present invention, into static information again.

Furthermore according to the present invention the time sequential information of the decimal point digit place may be converted into the static information. The decimal point digit time information P is applied to an AND gate B shown in FIG. 5 so that it may be transferred into a shift register PR by opening the AND gate B at time X. In response to the shift pulses the information is shifted in the shift register PR and then stopped and stored at the stage corresponding to the stage of the buffer register BR where the digit place information is stored. This means that the decimal point digit place information is stored in the shift register as the static information. Since this static decimal point digit position information may be continuously derived, this arrangement is advantageous when data are printed. When the shift register PR is used, the dynamic display different from that described with reference to FIG. 3 may be possible. That is, in the indicator shown in FIG. 3, the anodes P*o* – P*n* are sequentially energized by the digit pulses DT*o* – DT*n* whereas numeral information is applied to the cathodes Kp, K*o* – K9 whereby the dynamic display is made, but there has been devised and demonstrated a display system in which the cathodes K*p*, K*o* – K9 are sequentially energized by the pulses DT*o* – DT*n* whereas digit selecting information is applied to the anodes by the shift register SR. The present invention may be also applied to the above display system.

Figure 7:
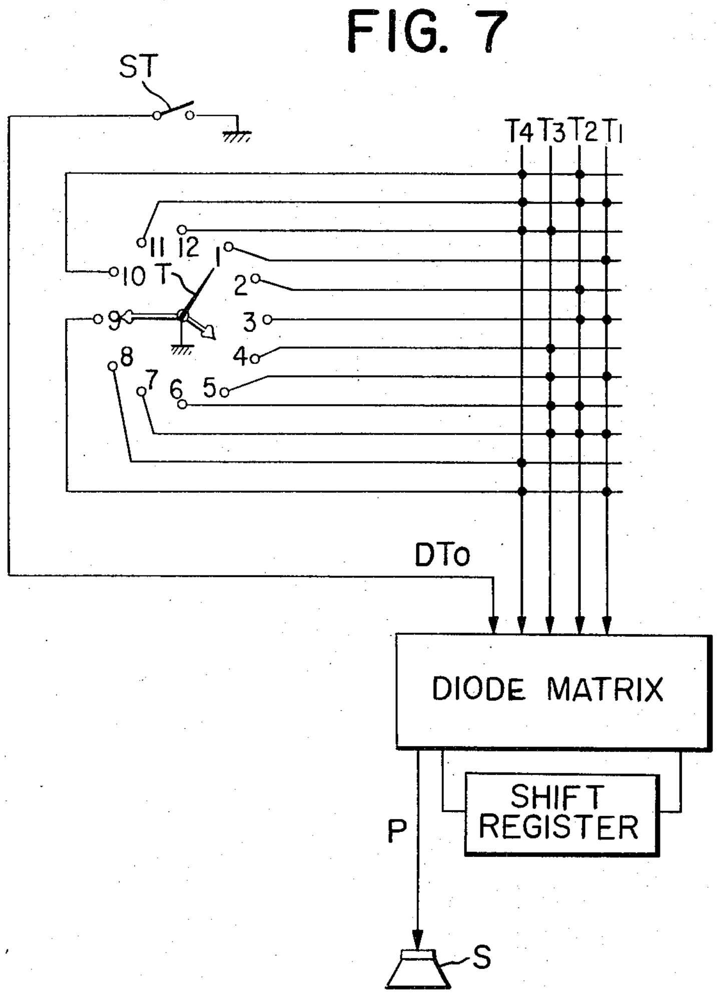
FIG. 7 is a circuit diagram of a second embodiment of the present invention.

Next referring to FIG. 7, the second embodiment of the present invention will be described. The second embodiment is used as a timer for a clock. For example the timer is such that a time interval from 12 o'clock to 1 o'clock is divided into a plurality of time intervals such as 5 minutes as in a usual clock. In the instant embodiment, a time interval of 5 minutes is selected, and an arm T is set to indicate 1 and then a start button ST is depressed. Then the output P is derived from the information conversion system in 5 minutes after the time DTo when the start button was depressed so that a buzzer S is actuated. In the conventional timers it is possible to set a time, but it is impossible to set in such a manner that the output may be derived in a predetermined time interval after the timer is set. However according to the present invention this becomes possible.

I claim:

1. A static-dynamic conversion system comprising:

a. storage means for storing a static digit position information, b. means for producing a reference signal for defining a reference digit position for said static digit position information, c. selecting means having matrix means for selectively storing binary coded information associated with said static digit position information, said binary coded information being read out in response to said reference signal, d. delaying means having shift means for delaying output signal derived from said selecting means, whereby said reference signal is delayed by the time corresponding to said static digit position information stored in said storage means, thereby converting said static digit position information into dynamic time-sequential information.

2. A static dynamic conversion system as defined in claim 1 wherein said matrix means is a diode matrix.

3. A static-dynamic conversion system as defined in claim 1 wherein said shift means is a shift register.

4. A static-dynamic conversion system as defined in claim 1 wherein said static digit position information provides information about a digit place of a numeral display device having a plurality of digit places where the decimal point is to be displayed, said decimal point digit place information being converted into dynamic information for display.

* * * * *

UNITED STATES PATENT OFFICE

CERTIFICATE OF CORRECTION

Patent No. 3,855,460 Dated December 17, 1974

Inventor(s) ICHIRO SADO

It is certified that error appears in the above-identified patent and that said Letters Patent are hereby corrected as shown below:

In the title page, Column 1, insert:

-- Foreign Application Priority Data

July 13, 1972 Japan 70108/1972 --

Signed and sealed this 4th day of March 1975.

(SEAL)
Attest:

RUTH C. MASON
Attesting Officer

C. MARSHALL DANN
Commissioner of Patents
and Trademarks